May 29, 1928. 1,671,633
B. F. FLEGEL ET AL
DIAL AND DIAL STRIP
Filed Sept. 20, 1926
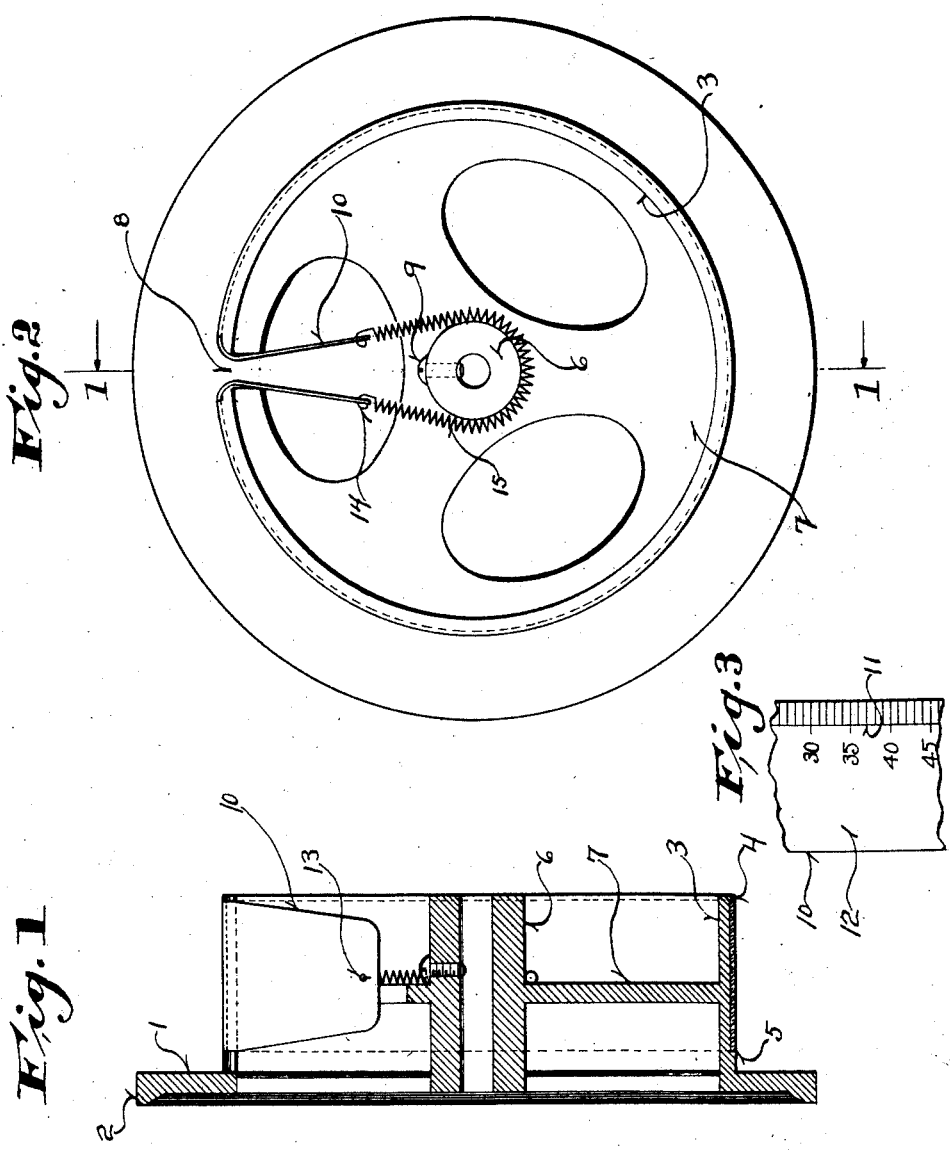
Inventors
Benjamin F. Flegel & W. Turnor Lewis
By
Attorneys Patented May 29, 1928.

1,671,633

UNITED STATES PATENT OFFICE.

BENJAMIN F. FLEGEL AND WILLIAM TURNOR LEWIS, OF RACINE, WISCONSIN, ASSIGNORS TO WESTERN COIL & ELECTRICAL CO., OF RACINE, WISCONSIN.

DIAL AND DIAL STRIP.

Application filed September 20, 1926. Serial No. 136,628.

This invention relates to a novel form of dial and dial strip.

Although the invention is particularly adapted for use as a tuning dial on radio sets, it is to be distinctly understood that the invention has other applications, and is not to be limited to this specific application.

Objects of this invention are to provide a tightening dial strip which is carried on a dial wheel in a novel manner, so that the strip is at all times maintained tight against the wheel and in its correct position both circumferentially and laterally of the wheel.

Further objects are to provide a novel form of construction which avoids the necessity of graduating a circular dial but, instead, permits the stamping of the scale upon a flat strip. Thereafter, the flat strip is readily positioned upon the dial wheel and secured thereto in an effective manner without the use of cement, glue, screws, rivets, or other fastening means of these types.

Further objects are to provide a construction in which the dial strip can be easily replaced by a new dial strip in case the dial strip becomes unduly soiled or mutilated, and to provide a dial strip in which a space is left for the operator to mark the different stations or other insignia as he desires.

Further objects are to provide a dial wheel and dial strip in which a cylindrical shell is formed integrally with the dial wheel and receives the dial strip, the ends of the strip projecting through a slot in the wheel, and such slot aligning with a set screw in the hub of the wheel to permit the insertion of a screw driver to tighten the set screw and to thus utilize the slot in a dual capacity.

An embodiment of the invention is shown in the accompanying drawings in which:

Figure 1 is a sectional view through the dial wheel and dial strip, such view corresponding to a section on the line 1—1 of Figure 2;

Figure 2 is a view of the dial wheel taken at right angles to Figure 1;

Figure 3 is a fragmentary detail of the dial strip.

Referring to the drawings, it will be seen that the dial wheel comprises a main disc-like member 1 which may, if desired, be provided with a knurled manipulating edge 2. This disc like member is integrally formed with a laterally projecting cylindrical drum-like portion 3 which is provided with an outer flange 4 of small depth and with an inner shoulder 5. Further, it is to be noted that the drum is joined to the hub 6 by means of a web 7, such web being preferably provided with apertures, as indicated in the drawing.

It is to be noted from Figure 2 that the cylindrical drum-like member 3 is provided with a slot 8, and a set screw 9 is passed through the hub 6 in alignment with the slot 8 so that a screw driver can be passed readily through the slot and engage the set screw.

The slot, however, serves a second purpose, as it permits the passage therethrough of the ends of a dial strip 10. This dial strip is initially stamped in a flat condition with the proper insignia, preferably consisting of a scale with numbers associated therewith as indicated at 11 in Figure 3. These markings are located adjacent one edge of the strip and the other edge or half portion is left blank, as indicated at 12, so that the operator may readily mark the different stations thereon. It is to be noted that the dial strip is positioned between the shoulder 5 and the flange 4, and is prevented from lateral shifting by this means. The ends of the dial strip are tapered, as indicated in Figure 1, and are each provided with an aperture 13 through which the hooked ends 14 of a helical spring 15 may be passed. This spring is preferably positioned around the hub, as shown in Figure 2, with its ends hooked, as stated, into the ends of the dial strip. Thus the dial strip is tightly clamped in place and is held against slipping, although it may be readily removed, and a new strip substituted, if desired.

Obviously, other means may be employed than the spring. For example, a rubber-band could be used for the resilient member and, in addition to this, the resilient member could be attached to some other portion of the wheel, if desired, or could merely join the ends of the strip, the strip being correspondingly shortened. However, the form shown is found to give excellent service, and is easily constructed.

It will be seen that a novel form of dial and dial strip has been provided, which is very easily constructed, and in which the marking of circular dial is avoided and, instead, a dial strip is stamped while in a flat condition, thus materially reducing the cost of manufacture. Further, the dial strip gives a relatively wide space so that the legends thereon can be easily read, as they may be formed of a material size, and also so that a space is left for individual "logging" or marking of the different stations by the operator.

Although the invention has been described in considerable detail, such description is intended as illustrative rather than limiting as the invention may be variously embodied and as the scope of such invention is to be determined as claimed.

We claim:

1. The combination of a dial wheel having a cylindrical portion, a dial strip surrounding said cylindrical portion, and resilient means secured to the ends of said strip for tensioning said strip and drawing such strip tightly into engagement with said cylindrical portion.

2. The combination of a dial wheel having a cylindrical portion and a manipulating disc-like portion, said dial wheel having a hub and a web connecting said hub and cylindrical member, said cylindrical member having a gap cut therethrough, a set screw passing through said hub and mounted in alignment with said gap, a dial strip surrounding said cylindrical portion and having its ends projecting inwardly through said gap, and a resilient member secured to the ends of said dial strip and passing around said hub.

3. The combination of a dial wheel having a cylindrical portion and a manipulating disc-like portion, said dial wheel having a hub and a web connecting said hub and cylindrical member, said cylindrical member having a gap cut therethrough, a set screw passing through said hub and mounted in alignment with said gap, a dial strip surrounding said cylindrical portion and having its ends projecting inwardly through said gap, and a resilient member secured to the ends of said dial strip and passing around said hub, said cylindrical member having shoulders on opposite sides of said dial strip.

4. The combination of a dial wheel having a cylindrical portion and having a disc-like portion, a hub joined to said cylindrical portion, said cylindrical portion having a gap therethrough, a dial strip surrounding said cylindrical portion and having its ends passed through said gap, and resilient means for drawing said ends towards each other.

In testimony that we claim the foregoing we have hereunto set our hands at Racine, in the county of Racine, and State of Wisconsin.

BENJAMIN F. FLEGEL.
WILLIAM TURNOR LEWIS.